United States Patent [19]

Hill

[11] 3,823,363
[45] July 9, 1974

[54] COOLING FAN OPERATING CIRCUITS FOR ROAD VEHICLES

[75] Inventor: William Frank Hill, Stafford, England

[73] Assignee: The Lucas Electrical Company Limited, Birmingham, England

[22] Filed: Apr. 2, 1973

[21] Appl. No.: 346,883

[30] Foreign Application Priority Data
Apr. 7, 1972  Great Britain.................... 16056/72

[52] U.S. Cl.............. 322/33, 123/41.12, 123/41.49, 180/82 R, 307/10 R, 323/75 E, 340/52 R
[51] Int. Cl.............................................. B60h 3/04
[58] Field of Search............. 307/9, 10 R; 323/75 E, 323/75 N; 322/33, 34; 180/82 R, 54 A, 103; 123/41.12, 41.49, 178 D; 340/52 R

[56] References Cited
UNITED STATES PATENTS
3,109,082  10/1963  Polaniecki....................... 323/75 N
3,371,708  3/1968  Chaparro....................... 323/75 N X
3,724,230  4/1973  Muto et al. ................... 307/10 R X FOREIGN PATENTS OR APPLICATIONS
191,019  12/1922  Great Britain................... 123/41.12
27,126  9/1970  Japan............................. 123/41.12

Primary Examiner—Gerald Goldberg
Attorney, Agent, or Firm—Holman & Stern

[57] ABSTRACT

A cooling fan for a road vehicle is operated in accordance with water temperature by sensing a potential close to a temperature gauge. This potential fluctuates by virtue of a vibrating contact voltage regulator used in the circuit, and a memory arrangement is used so that the operating of the circuit is independent of the regulator.

3 Claims, 1 Drawing Figure

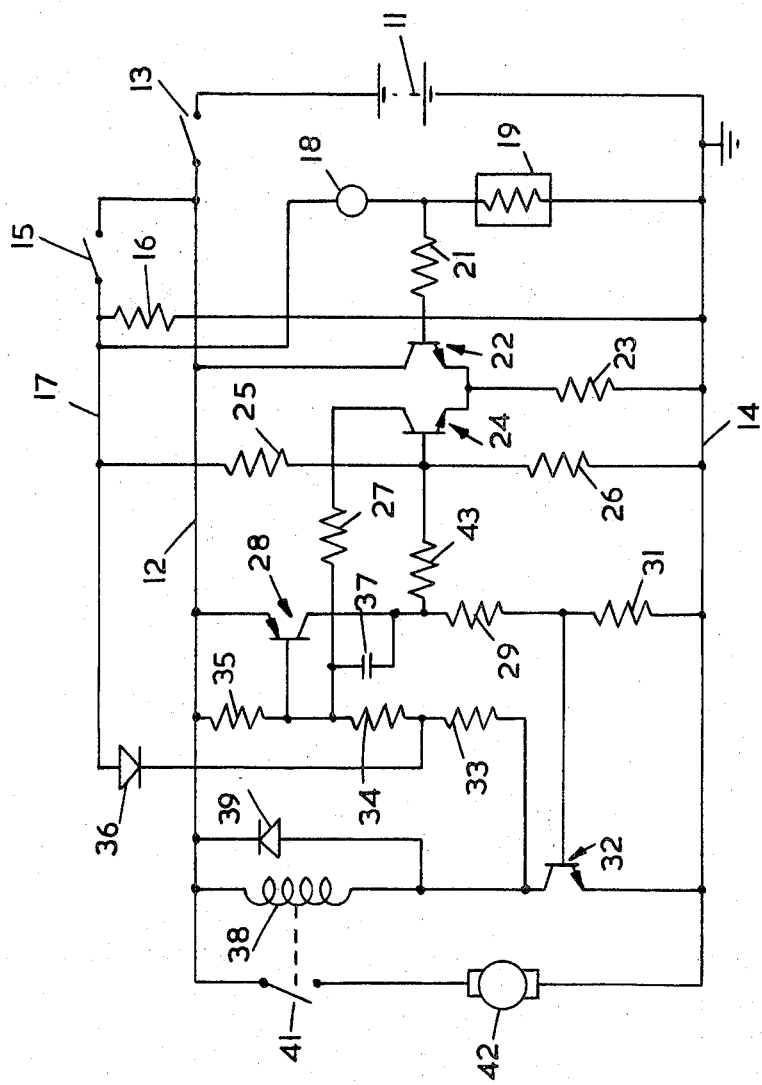

COOLING FAN OPERATING CIRCUITS FOR ROAD VEHICLES

This invention relates to cooling fan operating circuits for road vehicles of the kind including a vibrating contact voltage regulator controlling the supply of power from the vehicle battery to a series circuit including a temperature gauge and a temperature-sensitive resistance sensitive to engine water temperature.

A circuit according to the invention comprises switching means sensitive to the potential in said series circuit between the temperature gauge and the temperature-sensitive resistance for maintaining the cooling fan on when the water temperature exceeds a predetermined value independently of the opening and closing of the vibrating contact.

Preferably, operation of the cooling fan is controlled by a transistor which when the water temperature exceeds the predetermined value receives base current by way of a first supply path which is broken when the vibrating contact opens, but the circuit includes a capacitor which when the vibrating contact opens is coupled to the base-emitter of the transistor and operates a regenerative feedback circuit to hold the transistor conductive.

In the preferred arrangement, the temperature gauge and the temperature sensitive resistance form part of a Wheatstone bridge network which produces an output when the water temperature exceeds the predetermined value.

The accompanying drawing is a circuit diagram illustrating one example of the invention.

Referring to the drawing, a vehicle battery 11 has its positive terminal connected to a supply line 12 through the ignition switch 13 of the vehicle, and its negative terminal connected to a supply line 14 which conveniently is earthed. Connected between the lines 12, 14 is a vibrating contact voltage regulator of well-known form including a contact 15 and a heating element 16 in series. The junction of the contact 15 and heating element 16 is connected to a supply line 17, and the arrangement is such that when the contact 15 is closed, the heating element 16 heats up and opens the contact 15, whereupon the heating element 16 cools down again and the contact 15 closes.

Connected between the line 17 and the line 14 are a temperature gauge 18 and a thermistor 19 which is mounted in the cylinder head of the engine of the vehicle, and so assumes a resistance dependent upon the temperature of the water cooling the engine. This part of the circuit is of entirely conventional form, and it will be appreciated that the thermal inductance of the gauge 18 is such that opening and closing of the contact 15 does not cause the gauge 18 to flicker.

The junction of the gauge 18 and thermistor 19 is connected through a resistor 21 to the base of an n-p-n transistor 22 having its collector connected to the line 12 and its emitter connected to the line 14 through a resistor 23. A further n-p-n transistor 24 has its emitter connected to the line 14 through the resistor 23, and its base connected to the junction of a pair of resistors 25 and 26 connected in series between the lines 17, 14. The transistor 24 has its collector connected through a resistor 27 to the base of a p-n-p transistor 28, the emitter of which is connected to the line 12 and the collector of which is connected to the line 14 through a pair of resistors 29, 31 in series. The junction of the resistors 29 and 31 is connected to the base of an n-p-n transistor 32, the emitter of which is connected to the line 14 and the collector of which is connected to the line 12 through three resistors 33, 34, and 35 in series. The junction of the resistors 33 and 34 is connected through a diode 36 to the line 17, and the junction of the resistors 34 and 35 is connected to the base of the transistor 28, and is also connected through a capacitor 37 to the collector of the transistor 28. The collector of the transistor 32 is further connected to the line 12 through the winding 38 of a relay, the winding 38 being bridged by a diode 39 and serving when energised to close a normally open contact 41 which is connected in series with a fan motor 42 between the lines 12, 14.

The gauge 18 and thermistor 19 form one limb of a Wheatstone bridge network, the other limb of which is constituted by the resistors 25 and 26, and the detector of which is constituted by the long tailed pair 22, 24. Provided the water temperature is below a predetermined value, the transistor 22 conducts when the contact 15 is closed, so that the transistor 24 is off and no base current is provided to the transistor 28, and the transistors 28 and 32 are both off, so that the winding 38 is de-energised.

When the predetermined water temperature is reached, the transistor 22 turns off and the transistor 24 turns on provided the contact 15 is closed to provide base current to the transistor 24. Assuming that the contact 15 is closed, then the transistor 24 provides base current to the transistor 28, which turns on to provide base current to the transistor 32, which energises the winding 38 so that the contact 41 closes to start the motor 42. At the same time, the capacitor 37 is discharged. The transistor 32 does not provide further base current to the transistor 28, because current flowing through the resistor 33 is supplied by way of the diode 36 from the line 17, the contact 15 being closed at this stage.

When the contact 15 opens, the base circuit of the transistor 24 is broken and so the transistor 24 turns off and ceases to provide base current to the transistor 28. However, the charging current of the capacitor 37 holds the transistor 28 conductive, and since the diode 36 does not now conduct, the transistor 32 provides regenerative feedback to the base of the transistor 28, so that the transistors 28 and 32 are held on and the winding 38 remains energised. Thus, once the predetermined water temperature has been exceeded, the fan 42 will remain on.

Operation of the fan 42 will of course cool the water, but the circuit will not revert to the state in which the transistor 22 is on until a lower predetermined temperature is reached. The required differential in the operation of the Wheatstone bridge network is provided by virtue of a resistor 43 which is connected between the collector of the transistor 28 and the base of the transistor 24.

I claim:

1. A cooling fan operating circuit for a road vehicle, comprising in combination a battery, first and second supply lines, the second supply line being connected to one terminal of the battery, a vibrating contact voltage regulator coupling the first supply line to the other terminal of the battery, a series circuit interconnecting the first and second supply lines, said series circuit including a temperature gauge and a temperature-sensitive resistance sensitive to engine water temperature, a transistor having its base-emitter circuit coupled to the junction of said temperature sensitive resistance and temperature gauge, biasing means for said transistor whereby said transistor conducts when the vibrating contact voltage regulator is closed and the water temperature exceeds a predetermined value, a regenerative feedback circuit and associated capacitor operable to hold said transistor conductive when said vibrating contact voltage regulator opens provided said water temperature is above the predetermined value, and means operable when said transistor conducts to drive said cooling fan.

2. A cooling fan operating circuit for a road vehicle, comprising in combination a battery, first and second supply lines, the second supply line being connected to one terminal of the battery, a vibrating contact voltage regulator coupling said first supply line to the other terminal of the battery, a series circuit connected between said first and second supply lines and including a temperature gauge and a temperature-sensitive resistance sensitive to engine water temperature, semi-conductor switching means coupled to the junction of said temperature gauge and said temperature-sensitive resistance, said semi-conductor switching means operating when said water temperature exceeds a predetermined value and said vibrating contact voltage regulator is closed, means whereby operating of semi-conductor switching means drives said fan, and delay means operable when said water temperature is above the predetermined value and said vibrating contact voltage regulator opens for maintaining said semi-conductor switching means in its operated condition.

3. A circuit as claimed in claim 1 in which the temperature gauge and the temperature-sensitive resistance form part of a Wheatstone bridge network which produces an output when the water temperature exceeds the predetermined value.

* * * * *